(12) United States Patent
Natanzon et al.

(10) Patent No.: US 10,499,124 B1
(45) Date of Patent: Dec. 3, 2019

(54) DETECTION OF MALFUNCTIONING SENSORS IN A MULTI-SENSOR INTERNET OF THINGS ENVIRONMENT

(71) Applicant: EMC IP Holding Company LLC, Hopkinton, MA (US)

(72) Inventors: Assaf Natanzon, Tel Aviv (IL); Jehuda Shemer, Kfar Saba (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/024,759

(22) Filed: Jun. 30, 2018

(51) Int. Cl.
*H04Q 9/02* (2006.01)
*H04L 12/24* (2006.01)
*H04L 29/08* (2006.01)

(52) U.S. Cl.
CPC ............. *H04Q 9/02* (2013.01); *H04L 41/065* (2013.01); *H04L 41/147* (2013.01); *H04L 67/125* (2013.01); *H04Q 2213/13162* (2013.01)

(58) Field of Classification Search
CPC ............... G05B 19/4184; G05B 15/02; G05B 19/0428; G05B 2219/2642; G05B 2219/45031; G05B 9/03; G05B 19/4183; G05B 23/0256; G05B 23/027
USPC ....................................................... 340/3.43
See application file for complete search history.

(56) References Cited

U.S. PATENT DOCUMENTS

| | | | | |
|---|---|---|---|---|
| 7,246,024 B2* | 7/2007 | Muramatsu | ............. | F01D 17/02 60/39.281 |
| 7,565,229 B2* | 7/2009 | Andres | ................. | B60R 21/013 701/30.3 |
| 8,130,094 B2* | 3/2012 | Lu | ........................... | G16H 40/20 340/539.1 |
| 8,319,623 B2* | 11/2012 | Wallace | ................. | B60Q 11/00 188/1.11 L |
| 8,482,753 B2* | 7/2013 | Urasawa | ................. | G03G 15/55 358/1.14 |
| 9,719,866 B2* | 8/2017 | Kobayashi | ........... | G01K 15/007 |
| 10,086,782 B1* | 10/2018 | Konrardy | ................ | B60L 58/12 |
| 10,163,038 B2* | 12/2018 | Wang | ................... | G06K 9/6262 |

(Continued)

OTHER PUBLICATIONS

U.S. Appl. No. 15/959,592 entitled, "Data Management Policies for Internet of Things Components" filed Apr. 23, 2018.

*Primary Examiner* — Mark S Blouin (74) *Attorney, Agent, or Firm* — Ryan, Mason & Lewis, LLP (57) ABSTRACT

Techniques are provided for detection of malfunctioning sensors in a multi-sensor IoT environment. An exemplary method comprises: obtaining sensor data from a plurality of sensors; and determining if a first sensor is malfunctioning based on a comparison of the sensor data of the first sensor with the sensor data obtained from one or more additional sensors within the plurality of sensors, wherein the additional sensors within the plurality of sensors are identified based on a location and/or a sensor type of the additional sensors relative to a location and/or a sensor type of the first sensor. Remedial steps are optionally performed for a given malfunctioning sensor based on one or more predefined policies. For example, the remedial steps may comprise resetting the given malfunctioning sensor, calibrating the given malfunctioning sensor, servicing the given malfunctioning sensor, and/or notifying one or more users of the malfunction.

20 Claims, 7 Drawing Sheets

(56) References Cited

U.S. PATENT DOCUMENTS

| | | | |
|---|---|---|---|
| 10,262,474 B2* | 4/2019 | Gortsas | G07C 5/0808 |
| 2011/0060215 A1* | 3/2011 | Tupin, Jr. | A61B 5/0507 |
| | | | 600/425 |
| 2011/0184676 A1* | 7/2011 | Gershinsky | H04Q 9/00 |
| | | | 702/62 |
| 2016/0299256 A1* | 10/2016 | Modi | G01V 1/30 |
| 2017/0111210 A1* | 4/2017 | Chakrobartty | H04L 41/0631 |

* cited by examiner

FIG. 1

Malfunctioning Sensor Detection Policy 200

- Similar Sensor Type Rule(s) 210
- Proximate Sensor Rule(s) 220
- Environmental Knowledge Sensor Rule(s) 230
- Malfunctioning Sensor Handling Rules 240

Malfunctioning Sensor Detection Policy 500

Detect Malfunctioning Sensor Using Rules 210, 220 and/or 230 of Malfunctioning Sensor Detection Policy 200

Implement Malfunctioning Sensor Handling Rules 240 in response to Detected Malfunctioning Sensor(s)

DETECTION OF MALFUNCTIONING SENSORS IN A MULTI-SENSOR INTERNET OF THINGS ENVIRONMENT

FIELD

The field relates generally to the processing of sensor data.

BACKGROUND

The Internet of Things (IoT) is a network of distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

A number of IoT management frameworks exist for managing devices that generate and process sensor data. As society grows increasingly dependent on such sensor data, the proper management and reliability of the gathered sensor data also becomes important. Sensors may malfunction and report incorrect values, potentially impairing the reliability of the gathered sensor data. A failing thermostat, for example, may report an incorrect temperature value, or no temperature value at all.

A need exists for techniques for detecting malfunctioning sensors in a multi-sensor IoT environment.

SUMMARY

Illustrative embodiments of the present disclosure provide techniques for detection of malfunctioning sensors in a multi-sensor IoT environment. In one embodiment, an exemplary method comprises: obtaining sensor data from a plurality of sensors; and determining if a first one of the plurality of sensors is malfunctioning based on a comparison of the sensor data of the first sensor with the sensor data obtained from one or more additional sensors within the plurality of sensors, wherein the one or more additional sensors within the plurality of sensors are identified based on one or more of a location and a sensor type of the one or more additional sensors relative to one or more of a location and a sensor type of the first sensor.

In some embodiments, one or more predefined remedial steps are optionally performed for a given malfunctioning sensor based on one or more predefined policies. For example, the remedial steps for the given malfunctioning sensor may comprise resetting the given malfunctioning sensor, calibrating the given malfunctioning sensor, servicing the given malfunctioning sensor, and/or notifying one or more users of the malfunction.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for detection of malfunctioning sensors in a multi-sensor IoT environment.

In one or more embodiments, the disclosed multi-sensor malfunctioning sensor detection techniques compare sensor data from sensors satisfying predefined sensor similarity criteria and/or predefined sensor proximity criteria to detect outlier sensor readings or other unreliable sensor readings. In this manner, malfunctioning sensors can be identified to improve the overall IoT system accuracy and/or reliability. One or more embodiments leverage multi-sensor information and optionally employ cross-sensor distributed algorithms to detect one or more malfunctioning sensors.

One or more embodiments employ machine learning techniques to identify sensors satisfying predefined sensor similarity and/or predefined sensor proximity criteria, and to compare the sensor readings from such identified sensors to detect malfunctions. For example, the exemplary machine learning techniques can use sensors within proximity of one another to estimate if obtained sensor information comprises outliers suggesting a potential malfunction or valid measurements. In some embodiments, a probabilistic model is employed to estimate a probability that a given sensor (or sensor type) will malfunction.

In at least one embodiment, the disclosed multi-sensor malfunctioning sensor detection techniques detect one or more malfunctioning sensors and implement one or more predefined remedial actions when a malfunctioning sensor is identified. The use of sensor readings from multiple sensors can determine whether an outlier reading is a problem in the IoT system or a problem with a particular sensor, for example. By leveraging sensor readings from multiple similar sensors, based on, for example, predefined sensor similarity criteria (such as a comparison of temperature readings from thermostats and infrared cameras) and/or leveraging different sensors to evaluate the performance of sensors of different sensor types, an estimate can be created of how accurate a given sensor is, and thereby estimate the probability that a given sensor will malfunction.

In some embodiments, the disclosed malfunctioning sensor detection techniques are based on a proximity between sensors, such as vehicle sensors. It has been found that sensors with close geographical proximity and/or temporal proximity tend to create similar or even substantially identical sensor data. By creating localized dynamic distributed sensor networks, time, space and/or sensor type information among multiple sensors can be coordinated and thereby allow a malfunctioning sensor to be detected.

In one or more embodiments, holistic malfunctioning sensor detection policy techniques are provided for treating malfunction sensors in an IoT system. The disclosed malfunctioning sensor detection policies connect IoT components, their sensor data and corresponding metadata in a way that allows advanced malfunctioning sensor detection techniques to be applied across a distributed network of sensor devices within an IoT system. One or more aspects of the present disclosure recognize that complex IoT systems have malfunctioning sensor detection needs, and the failure to address these needs may result in degraded system performance or a loss of service.

Figure 1:
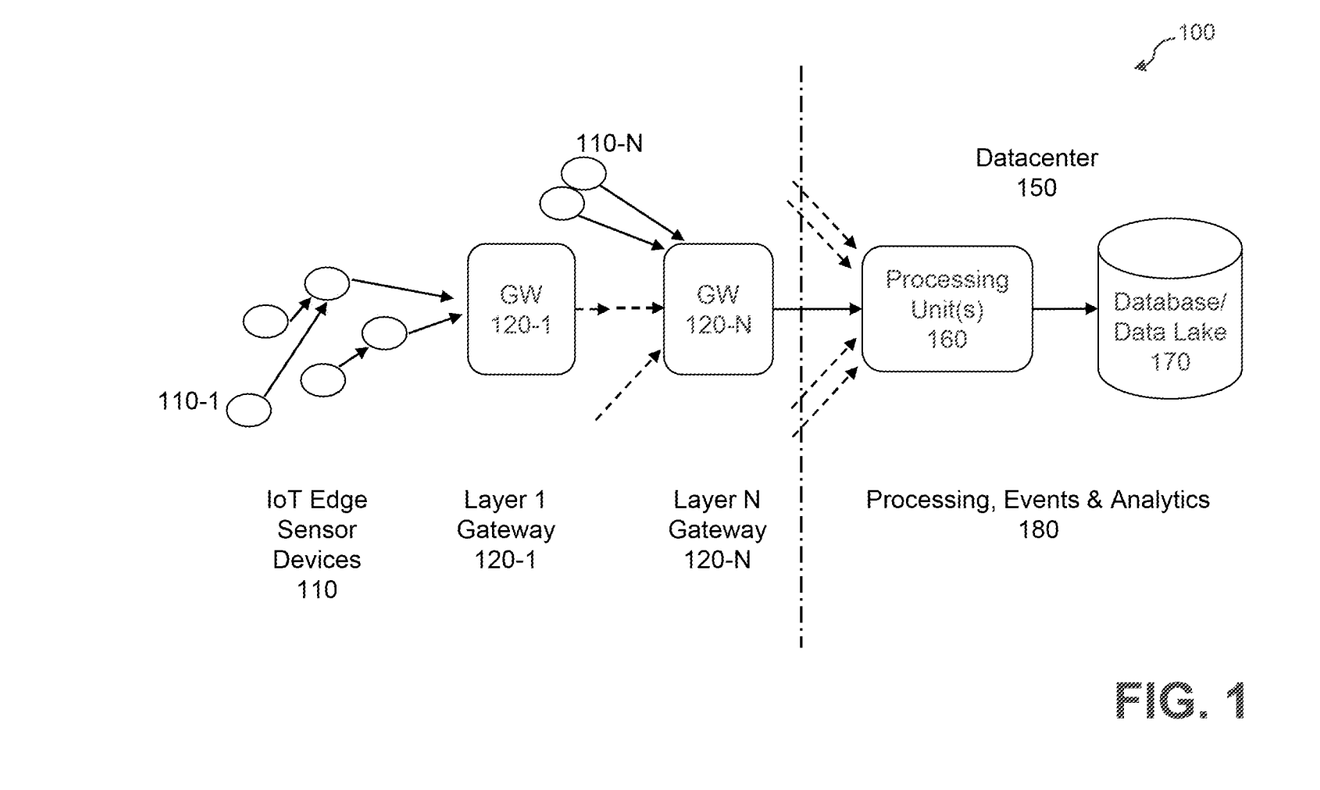
FIG. 1 illustrates an exemplary IoT system, according to one embodiment of the disclosure.

FIG. 1 illustrates an exemplary IoT system 100, according to one embodiment of the disclosure. Generally, IoT systems, such as the exemplary IoT system 100, typically consolidate edge devices to gateways and then to a central backend datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. For example, a vehicle can be treated as a first gateway layer 110-1 to the multiple sensors that exist within the vehicle. In some embodiments, vehicles are connected to a regional edge layer (not explicitly shown in FIG. 1), where the region can be, for example, a cell of a cellular network. The regional gateways can be connected in some embodiments to Country cloud/gateway that are connected to a global cloud.

One or more sensor devices 110 in vehicles, for example, can generate and distribute high resolution images and maps. One or more aspects of the present disclosure recognize that the sensor data generated by multiple sensors of a distributed network of vehicles, for example, can be used to detect malfunctioning sensors.

While gateways 120 are employed in the exemplary embodiment of FIG. 1, the gateways 120 are not mandatory. Gateways 120 are prevalent in numerous implementations, as networking capabilities of edge devices 110 are usually local in nature (e.g., power or connectivity) and the gateway 120 is used to connect to the Internet (not shown in FIG. 1).

The sensors 110 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

While one or more exemplary embodiments are described herein using sensor devices 110 associated with vehicles, any sensors can be employed, such as sensor devices 110, as would be apparent to a person of ordinary skill in the art.

Figure 2:
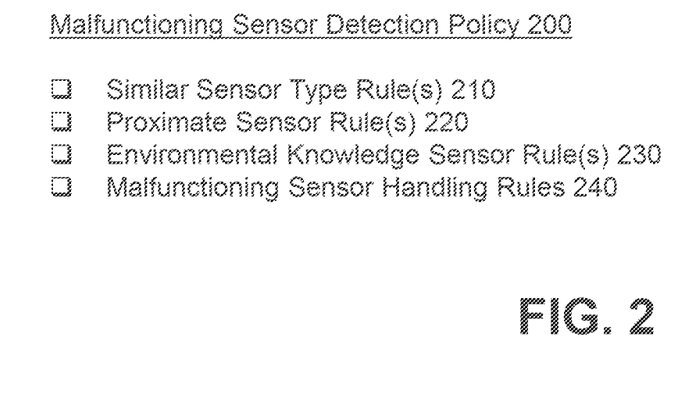
FIG. 2 illustrates an exemplary malfunctioning sensor detection policy, according to some embodiments.

FIG. 2 illustrates an exemplary malfunctioning sensor detection policy 200, according to some embodiments. Generally, the exemplary malfunctioning sensor detection policy 200 defines how the sensor data of various IoT sensor devices 110 of the exemplary IoT system 100 of FIG. 1 can be compared to detect malfunctioning sensors. As noted above, in some embodiments, the disclosed multi-sensor malfunctioning sensor detection techniques compare sensor data from sensors satisfying predefined sensor similarity criteria and/or predefined sensor proximity criteria to detect outlier sensor readings or other unreliable sensor readings. The exemplary predefined sensor similarity criteria and/or predefined sensor proximity criteria can be specified as part of the exemplary malfunctioning sensor detection policy 200.

In one or more embodiments, a first malfunctioning sensor is identified based on a comparison of the sensor data of the first sensor with the sensor data obtained from one or more additional sensors. The one or more additional sensors are identified in some embodiments based on one or more of a location and sensor type of the additional sensors relative to a location and/or a sensor type of the first sensor, as specified, for example, in the exemplary malfunctioning sensor detection policy 200.

As shown in FIG. 2, the exemplary malfunctioning sensor detection policy 200 comprises one or more similar sensor type rule(s) 210; one or more proximate sensor rule(s) 220; one or more environmental knowledge sensor rule(s) 230; and/or one or more malfunctioning sensor handling rules 240.

In some embodiments the similar sensor type rule(s) 210 can specify that the first sensor and the additional sensor(s) have a predefined substantially similar sensor type. In at least one embodiment, the similar sensor type rule(s) 210 are employed to specify when two sensors are of a sufficiently similar type to allow a data reduction in accordance with the disclosed data reduction techniques. For example, the similar sensor type rule(s) 210 can specify that the first sensor comprises a first predefined sensor type and the one or more additional sensors comprise one or more additional predefined sensor types (e.g., the first sensor may comprise a thermostat and the additional sensor may comprise an infrared camera).

It is noted that the sensor type rule(s) 210 do not need to require that the sensors are of the same type. The sensor type rule(s) 210 may require that the sensors measure comparable information. For example, a camera positioned at a traffic light that takes images of a car can estimate the car speed for comparison to readings from the speedometer/accelerometer of the car. Likewise, an infrared camera can estimate temperatures and verify whether thermostat sensors are taking accurate temperature measurements.

Images from two different cameras in the vicinity of one another, and pointing in similar directions, can be compared in some embodiments to identify dirt on a camera that may obscure an image or an object in the image (such as a pedestrian from an autonomous car, potentially causing an accident).

In some embodiments, the proximate sensor rule(s) 220 can specify that the first sensor and the additional sensor(s) have a predefined substantially similar sensor location. In at least one embodiment, the proximate sensor type rule(s) 220 are employed to specify when two sensors are sufficiently close to allow a data reduction in accordance with the disclosed data reduction techniques.

One or more aspects of the disclosure recognize that sensors of the same sensor type, located at the same geo-location, at the same time or a similar time, will measure substantially the same value. Thus, the similar sensor type rule(s) 210 and the proximate sensor rule(s) 220 can optionally be combined, for example, to compare sensor data from sensors of the same sensor type located at the same geo-location (and optionally at the same or similar time). Multiple thermostats, for example, will measure temperatures that should be very similar in close locations (unless, of course, one of the sensors had a reason for the temperature change). Likewise, multiple cameras in a close location, time and direction will tend to create similar images. Thus, if one camera, for example, obtains an image of a sunny day while another camera obtains an image of a foggy day, one of the cameras may be malfunctioning.

In some embodiments, the environmental knowledge sensor rule(s) 230 can specify one or more external sources of environmental information which can be used to validate sensor readings. For example, a humidity value can be measured by an IoT humidity sensor (e.g., a humidistat sensor) at a particular location, which can be compared to an estimated humidity value for the particular location obtained, for example, from a weather forecast or another predefined data source.

In some embodiments, the disclosed malfunctioning sensor detection techniques detect one or more malfunctioning sensors and implement one or more predefined remedial actions when a malfunctioning sensor is identified. The malfunctioning sensor handling rules 240 optionally specify one or more predefined remedial steps for a given malfunctioning sensor based on one or more predefined policies. For example, the predefined steps of one or more malfunctioning sensor handling rules 240 may specify one or more of the following possible remedial actions:
  auto-calibrate (e.g., use data from other data sources for calibration);
  reset power on a sensor;
  initiate an auto-clean mechanism for glass lens, for example; and/or
  notify user(s) (e.g., with directions for a repair; location and identifiers of malfunctioning sensor(s); and/or location of a suitable service center and/or vendor to repair, replace and/or calibrate malfunctioning sensor).

The malfunctioning sensor detection policy 200 optionally also specifies a predefined handling of the sensor data obtained from a malfunction sensor. For example, when a malfunction is detected one or more sensors using the disclosed techniques, the malfunctioning sensor detection policy 200 may specify that samples from the one or more malfunctioning sensors are discarded until the malfunctioning sensors are repaired or replaced.

Figure 3:
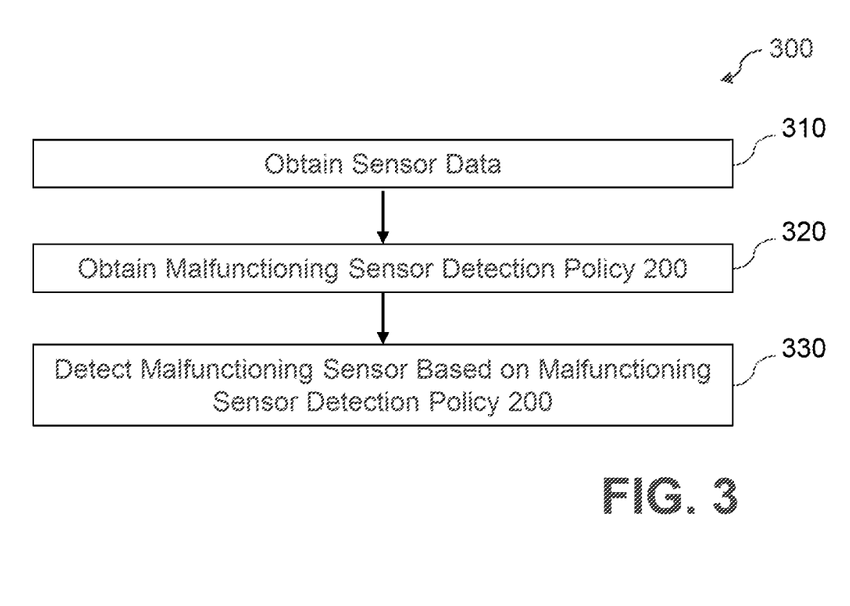
FIG. 3 is a flow chart illustrating a malfunctioning sensor detection policy implementation process, according to an embodiment of the disclosure.

FIG. 3 is a flow chart illustrating a malfunctioning sensor detection policy implementation process 300, according to an embodiment of the disclosure. The exemplary malfunctioning sensor detection policy implementation process 300 is implemented by a given IoT component in the IoT system 100 of FIG. 1 (e.g., the techniques can be applied at any level, such as multiple sensors within an area, or by gateways, concentrators, hubs or other aggregation devices of the same type, or a different type). As shown in FIG. 3, during step 310, the exemplary malfunctioning sensor detection policy implementation process 300 initially obtains sensor data. During step 320, the IoT component obtains the malfunctioning sensor detection policy 200 (FIG. 2). Finally, during step 330, the exemplary malfunctioning sensor detection policy implementation process 300 detects a malfunctioning sensor based on the malfunctioning sensor detection policy 200.

Figure 4:
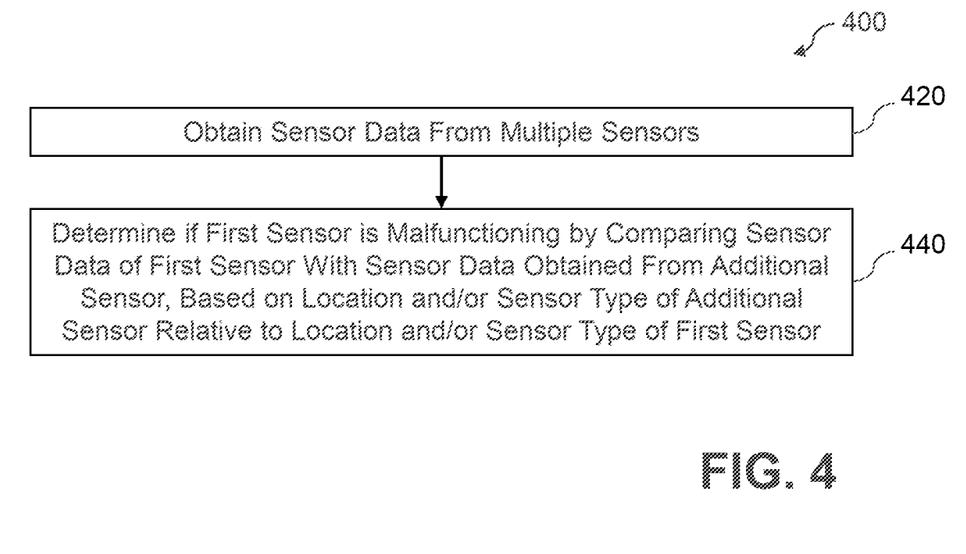
FIG. 4 is a flow chart illustrating an exemplary implementation of a malfunctioning sensor detection process, according to some embodiments of the disclosure.

FIG. 4 is a flow chart illustrating an exemplary implementation of a malfunctioning sensor detection process 400, according to some embodiments of the disclosure. As shown in FIG. 4, the exemplary malfunctioning sensor detection process 400 initially obtains sensor data from multiple sensors during step 420. The sensor data can be collected, for example, in a centralized location (such as a gateway device 120 in one of the levels or in the datacenter 150 of FIG. 1).

Thereafter, during step 440, the exemplary malfunctioning sensor detection process 400 determines if a first sensor is malfunctioning by comparing the sensor data of the first sensor with sensor data obtained from one or more additional sensors, based on a location and/or a sensor type of the additional sensor(s) relative to the location and/or the sensor type of the first sensor (based on, for example, one or more similar sensor type rule(s) 210 and/or proximate sensor rule(s) 220 of the exemplary malfunctioning sensor detection policy 200 of FIG. 2).

Figure 5:
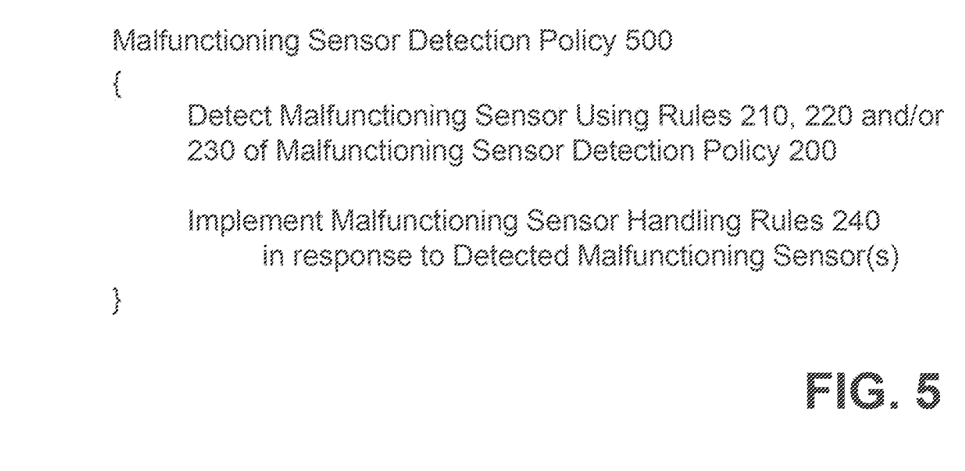
FIG. 5 illustrates exemplary pseudo code for a malfunctioning sensor detection policy for the exemplary IoT system of FIG. 1, according to one embodiment of the disclosure.

FIG. 5 illustrates exemplary pseudo code for a malfunctioning sensor detection policy 500 for the exemplary IoT system 100 of FIG. 1, according to one embodiment of the disclosure. In one or more embodiments, the exemplary malfunctioning sensor detection policy 500 is built system wide, across the IoT system 100 of FIG. 1 (or portions thereof). In the example of FIG. 5, a malfunctioning sensor policy can be used to define a malfunctioning sensor and to define how to detect such a malfunctioning sensor based on, for example, the above stated sensor similarity, spatial and/or temporal criteria and other aspects.

For a more detailed discussion of suitable techniques for using a policy and propagating the policy throughout the IoT system 100, see, for example, U.S. patent application Ser. No. 15/959,592, filed Apr. 23, 2018, entitled "Data Management Policies for Internet of Things Components," incorporated by reference herein in its entirety.

The policy can be defined according to geography (regionally, for example), over time (e.g., perform malfunction detection and/or remedial measures at night) or dynamically (e.g., in response to a detected sensor malfunction). Vehicles and other sensors are optionally updated with the malfunctioning sensor detection policies 500, as those may change over time/location and the sensors can adapt accordingly.

As shown in FIG. 5, in some embodiments, the exemplary malfunctioning sensor detection policy 500 optionally detects malfunctioning sensors using one or more of the similar sensor type rule(s) 210; proximate sensor rule(s) 220; and/or environmental knowledge sensor rule(s) 230 of the malfunctioning sensor detection policy 200.

When one or more malfunctioning sensors are detected, the exemplary malfunctioning sensor detection policy 500 specifies that the predefined malfunctioning sensor handling rules 240 are implemented, as discussed above in conjunction with FIG. 2.

In some embodiments, the malfunctioning sensor detection framework can support multiple environments. In one or more embodiments, the malfunctioning sensor detection algorithms will have generic APIs for specifying one or more of the similar sensor type rule(s) 210; proximate sensor rule(s) 220; and/or environmental knowledge sensor rule(s) 230 of the malfunctioning sensor detection policy 200.

One or more embodiments of the disclosed malfunctioning sensor detection techniques detect malfunctioning sensors by comparing the sensor readings of multiple sensors that satisfy one or more of sensor similarity, spatial and/or temporal criteria and other aspects.

One or more embodiments of the disclosure provide improved methods, apparatus and computer program products for implementing malfunctioning sensor detection policies and techniques for various components of an IoT system. The foregoing applications and associated embodiments should be considered as illustrative only, and numerous other embodiments can be configured using the techniques disclosed herein, in a wide variety of different applications.

It should also be understood that the disclosed techniques for implementing malfunctioning sensor detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing malfunctioning sensor detection policies for various components of an IoT system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a malfunctioning sensor detection policy engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a malfunctioning sensor detection policy platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
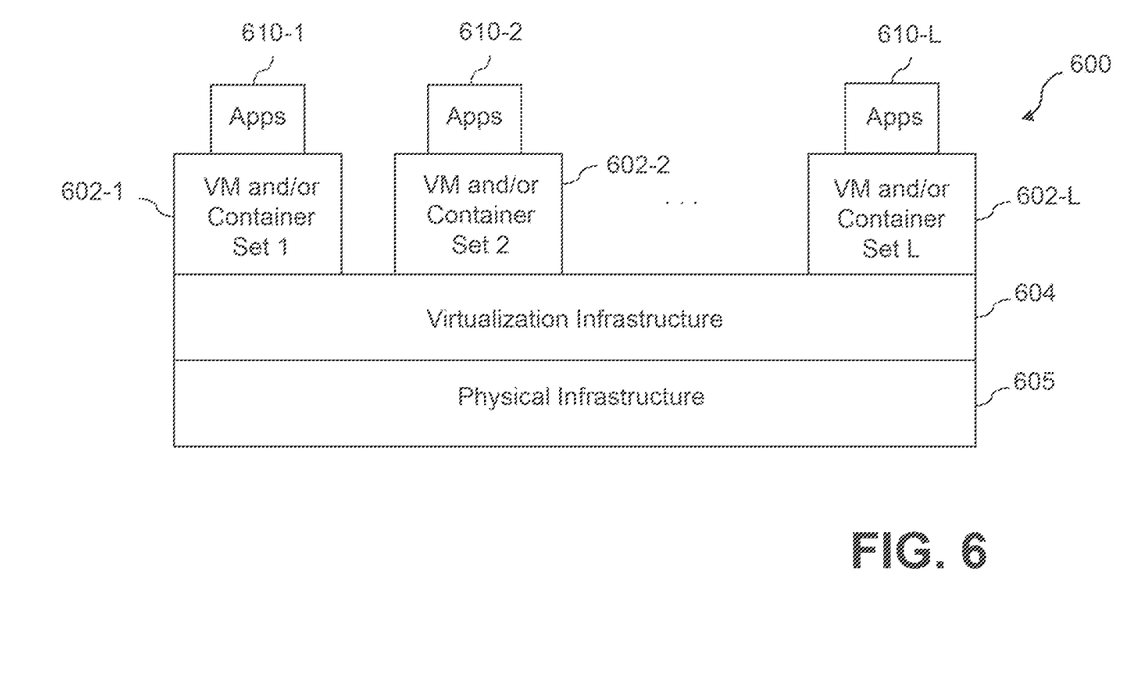
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed malfunctioning sensor detection system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide malfunctioning sensor detection functionality of the type described above for one or more processes running on a given one of the VMs. For example, each of the VMs can implement malfunctioning sensor detection control logic and associated malfunctioning sensor detection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide malfunctioning sensor detection functionality of the type described above for one or more processes running on different ones of the containers. For example, a container host device supporting multiple containers of one or more container sets can implement one or more instances of malfunctioning sensor detection control logic and functions.

As is apparent from the above, one or more of the processing modules or other components of the disclosed malfunctioning sensor detection system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
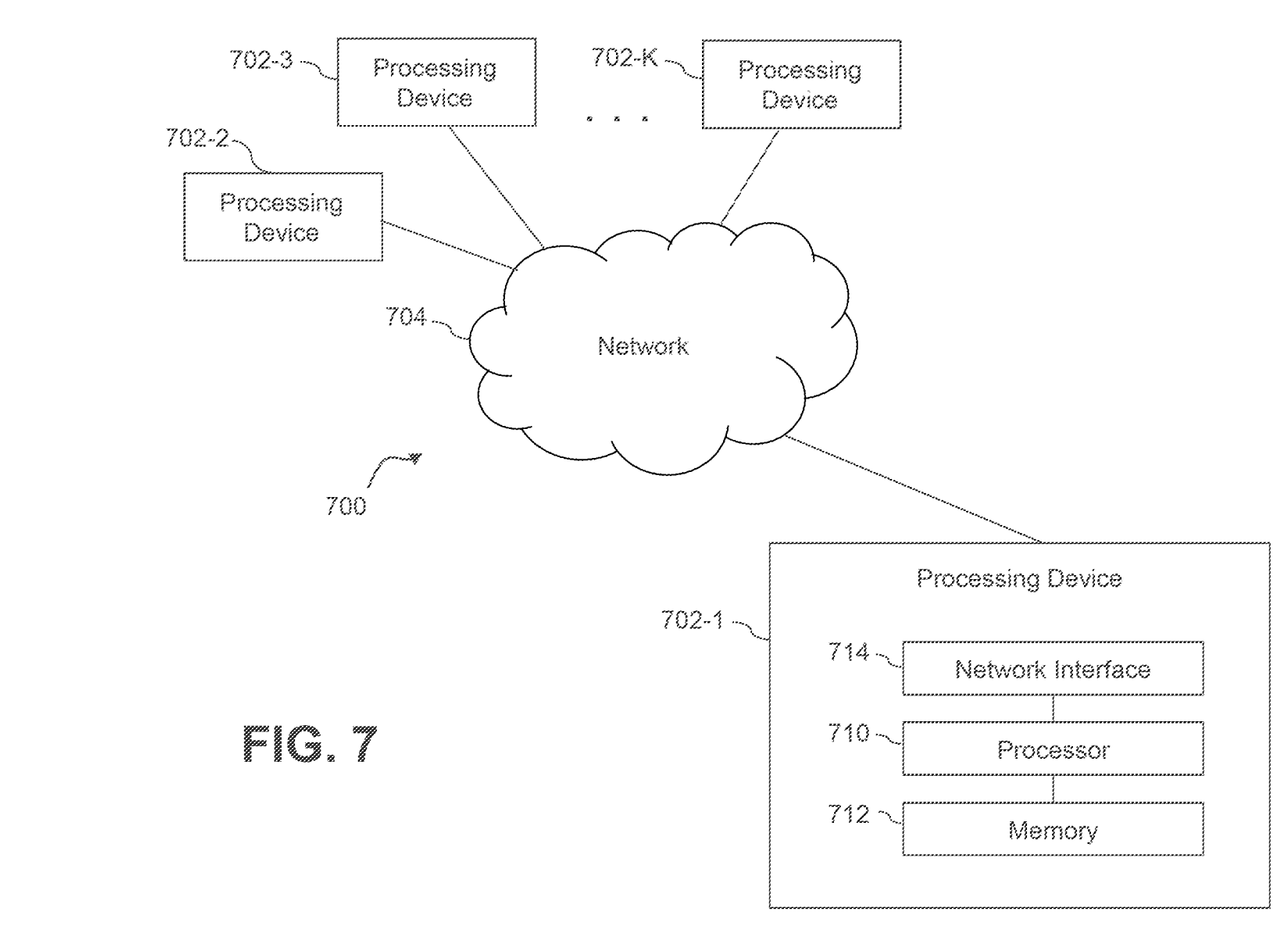
FIG. 7 illustrates another exemplary processing platform that may be used to implement at least a portion of one or more embodiments of the disclosure.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining sensor data from a plurality of sensors; and
   determining, by at least one processing device, if a first one of the plurality of sensors is malfunctioning based on a comparison of the sensor data of the first sensor with the sensor data obtained from one or more additional sensors within the plurality of sensors, wherein the one or more additional sensors within the plurality of sensors are identified based on one or more of a location and a sensor type of the one or more additional sensors relative to one or more of a location and a sensor type of the first sensor.

2. The method of claim 1, wherein the sensor data of at least one of the additional sensors comprises environmental knowledge.

3. The method of claim 1, further comprising the step of performing one or more predefined steps for a given malfunctioning sensor based on one or more predefined policies.

4. The method of claim 3, wherein the one or more predefined steps for the given malfunctioning sensor comprise one or more of the following predefined steps: resetting the given malfunctioning sensor, calibrating the given malfunctioning sensor, servicing the given malfunctioning sensor, and notifying one or more users of the malfunction.

5. The method of claim 1, wherein the first sensor and the one or more additional sensors comprise sensors that have a substantially similar sensor type and a substantially similar sensor location.

6. The method of claim 1, wherein the first sensor comprises a first predefined sensor type and wherein the one or more additional sensors comprise one or more additional predefined sensor types.

7. The method of claim 1, wherein the step of determining if the first sensor is malfunctioning further comprises estimating a value of the sensor data based on a predefined source of information.

8. The method of claim 1, further comprising the step of estimating a probability that a given sensor will malfunction based on a probabilistic model.

9. A system, comprising:
a memory; and
at least one processing device, coupled to the memory, operative to implement the following steps:
obtaining sensor data from a plurality of sensors; and
determining, by the at least one processing device, if a first one of the plurality of sensors is malfunctioning based on a comparison of the sensor data of the first sensor with the sensor data obtained from one or more additional sensors within the plurality of sensors, wherein the one or more additional sensors within the plurality of sensors are identified based on one or more of a location and a sensor type of the one or more additional sensors relative to one or more of a location and a sensor type of the first sensor.

10. The system of claim 9, further comprising the step of performing one or more predefined steps for a given malfunctioning sensor based on one or more predefined policies.

11. The system of claim 9, wherein the first sensor and the one or more additional sensors comprise sensors that have a substantially similar sensor type and a substantially similar sensor location.

12. The system of claim 9, wherein the first sensor comprises a first predefined sensor type and wherein the one or more additional sensors comprise one or more additional predefined sensor types.

13. The system of claim 9, wherein the step of determining if the first sensor is malfunctioning further comprises estimating a value of the sensor data based on a predefined source of information.

14. The system of claim 9, further comprising the step of estimating a probability that a given sensor will malfunction based on a probabilistic model.

15. A computer program product, comprising a tangible machine-readable storage medium having encoded therein executable code of one or more software programs, wherein the one or more software programs when executed by at least one processing device perform the following steps:
obtaining sensor data from a plurality of sensors; and
determining, by the at least one processing device, if a first one of the plurality of sensors is malfunctioning based on a comparison of the sensor data of the first sensor with the sensor data obtained from one or more additional sensors within the plurality of sensors, wherein the one or more additional sensors within the plurality of sensors are identified based on one or more of a location and a sensor type of the one or more additional sensors relative to one or more of a location and a sensor type of the first sensor.

16. The computer program product of claim 15, further comprising the step of performing one or more predefined steps for a given malfunctioning sensor based on one or more predefined policies.

17. The computer program product of claim 15, wherein the first sensor and the one or more additional sensors comprise sensors that have a substantially similar sensor type and a substantially similar sensor location.

18. The computer program product of claim 15, wherein the first sensor comprises a first predefined sensor type and wherein the one or more additional sensors comprise one or more additional predefined sensor types.

19. The computer program product of claim 15, wherein the step of determining if the first sensor is malfunctioning further comprises estimating a value of the sensor data based on a predefined source of information.

20. The computer program product of claim 15, further comprising the step of estimating a probability that a given sensor will malfunction based on a probabilistic model.

* * * * *